United States Patent
Parikh (10) Patent No.: US 9,977,965 B1
(45) Date of Patent: May 22, 2018

(54) TEACHING A ROBOT TO PLACE OBJECTS IN DYNAMIC ENVIRONMENTS

(71) Applicant: FUJITSU LIMITED, Kawasaki-shi, Kanagawa (JP)

(72) Inventor: Samir Parikh, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/633,700

(22) Filed: Jun. 26, 2017

(51) Int. Cl.
*B25J 9/22* (2006.01)
*G06K 9/00* (2006.01)
*B25J 9/16* (2006.01)

(52) U.S. Cl.
CPC .......... *G06K 9/00677* (2013.01); *B25J 9/163* (2013.01); *B25J 9/1697* (2013.01); *G05B 2219/40154* (2013.01); *G05B 2219/40564* (2013.01)

(58) Field of Classification Search
CPC ............... G05D 1/0246; G05D 1/0274; G05B 2219/40583; G05B 2219/39295; G05B 2219/39984
See application file for complete search history.

(56) References Cited

U.S. PATENT DOCUMENTS

2017/0337508 A1* 11/2017 Bogolea ............... G06Q 10/087

OTHER PUBLICATIONS

Fitzgerald, C.. Developing Baxter. In Technologies for Practical Robot Applications (TePRA), 2013 IEEE International Conference on (pp. 1-6). IEEE. (Apr. 2013).
Harada, K., Tsuji, T., Nagata, K., Yamanobe, N., & Onda, H.. Validating an object placement planner for robotic pick-and-place tasks. Robotics and Autonomous Systems, 62(10), 1463-1477. (Jun. 13, 2014).
Jiang, Y., & Saxena, A.. Hallucinating humans for learning robotic placement of objects. In Experimental Robotics (pp. 921-937). Springer International Publishing. (2013).
Guha, A. I., & Tellex, S. Towards Meaningful Human-Robot Collaboration on Object Placement, Thesis, Brown University (Jul. 2016).

\* cited by examiner

*Primary Examiner* — Karen Masih
(74) *Attorney, Agent, or Firm* — Maschoff Brennan (57) ABSTRACT

A method may include obtaining first images, each image including an object, and determining a set of one or more visual cues for each. The method may include selecting a common visual cue of the one or more visual cues that is common to each set of one or more visual cues determined for each corresponding image and determining a correlation between a location of the common visual cue in each image of the first images and a location of the object in each image of the first images. The method may include obtaining a second image of an environment and identifying the common visual cue in the second image. The method may include determining a placement location for the object in the environment based on the correlation and a location of the common visual cue in the second image.

20 Claims, 4 Drawing Sheets

TEACHING A ROBOT TO PLACE OBJECTS IN DYNAMIC ENVIRONMENTS

FIELD

The embodiments discussed herein are related to teaching a robot to place objects in dynamic environments.

BACKGROUND

Automated placement of objects in robotic task execution may generally be done in a few different ways. For example, object placement may be performed by specifying a particular location in a predetermined coordinate frame. Alternatively, object placement may be performed by analyzing an environment and determining a stable location for the object. In addition, automated object placement may include analyzing prior data about object placement by humans to determine object locations or may work in collaboration with a human to determine the location for the object.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining first images, each image of the first images including an object, and determining a set of one or more visual cues for each image of the first images. The method may include selecting a common visual cue of the one or more visual cues that is common to each set of one or more visual cues determined for each corresponding image and determining a correlation between a location of the common visual cue in each image of the first images and a location of the object in each image of the first images. The method may include obtaining a second image of an environment and identifying the common visual cue in the second image. The method may include determining a placement location for the object in the environment based on the correlation and based on a location of the common visual cue in the second image.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some systems and methods disclosed here are directed to teaching a robot to place an object in a dynamic environment. Within the context of teaching a robot to place an object, different methods may be employed. The object may be placed in a particular location in a predetermined coordinate frame. Alternatively, the object may be placed in a location based on a stability analysis of different locations. In addition, the object may be placed in a location based on analysis of prior data about object placement by humans. In contrast, one or more techniques described herein may teach a robot to place an object in a dynamic environment based on visual cues in the environment.

Figure 1:
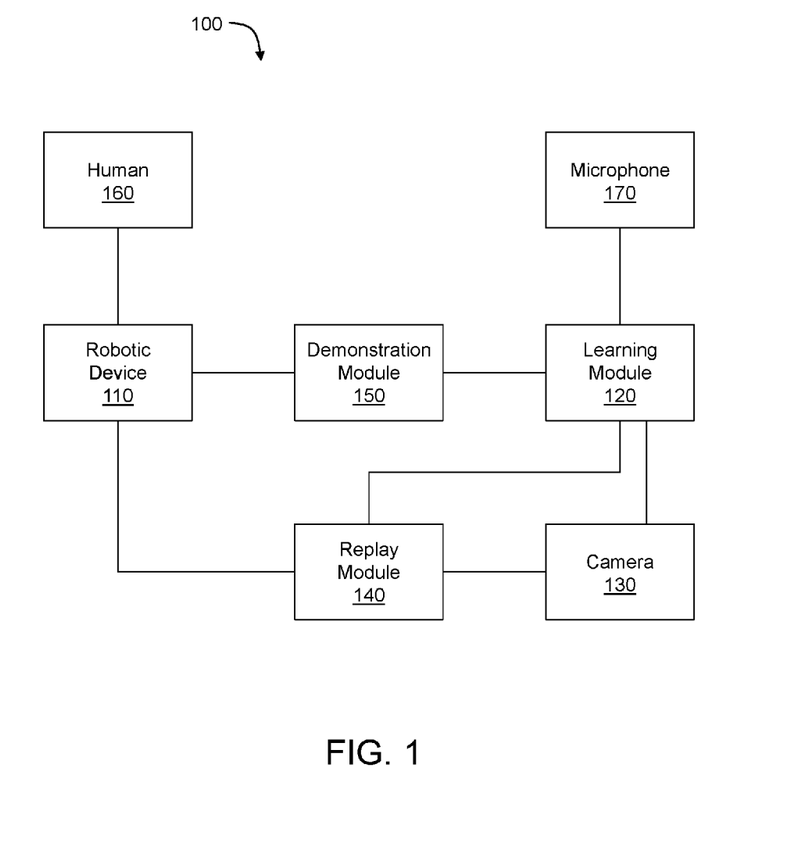
FIG. 1 illustrates an example system configured to teach a robotic device to place objects in a dynamic environment.

FIG. 1 illustrates an example system 100 configured to teach a robotic device to place objects in a dynamic environment, arranged in accordance with at least one embodiment described herein. The system may include a robotic device 110, a learning module 120, a camera 130, a replay module 140, a demonstration module 150, a human 160, and a microphone 170.

In some embodiments, the robotic device 110 may include a robot, a robotic system, a robotic arm, and/or other mechanized features that may be configured to perform operations, including lifting and/or moving objects. For example, in some embodiments, the robotic device 110 may be an automated arm associated with a moving conveyor belt in a factory. The robotic device 110 may be configured to place objects in particular locations on the conveyor belt or more generally to place objects in particular locations in relation to other objects. The robotic device 110 may be communicatively coupled with the replay module 140 and the demonstration module 150.

In some embodiments, a human 160 may interact with the robotic device 110 and may provide kinesthetic demonstration data to the robotic device 110. The kinesthetic demonstration data may be provided to the robotic device 110 by the manipulation of the robotic device 110 by the human 160. For example, in some embodiments, the human 160 may manually position the robotic device 110 in a configuration to place an object in a target location. The robotic device 110 may obtain demonstration data from the human 160 related to the positioning of the robotic device while placing the object in the target location. For example, the demonstration data may include joint data related to the positioning of a robotic arm. The demonstration data from observation of the human 160 may be transmitted to the demonstration module 150 from the robotic device 110.

The robotic device 110 may receive target data from the replay module 140. The target data may include electronic signals that may indicate a target position or positions for the robotic device 110 and/or a target position for an object to be moved by the robotic device 110. The target data may include joint targets. For example, the target data may include a target position for each joint of the robotic device 110. The robotic device 110 may be positioned based on the target position(s) received from the replay module 140.

The learning module 120 may be communicatively coupled with the camera 130, the replay module 140, the demonstration module 150, and the microphone 170. The learning module 120 may include software and programming. The software and programming of the learning module 120 may be configured to use machine learning to identify the placement location for an object. For example, the learning module 120 may obtain multiple images from the camera 130. Alternatively or additionally, the learning module 120 may obtain multiple images from a source such as a network or the Internet. For example, the learning module 120 may obtain multiple images from an image database communicatively coupled with the learning module 120 via one or more networks.

The multiple images obtained by the learning module 120 may each include the object. The "object" included in each of the images may include the same object in each and every image, distinct but visually identical objects in two or more of the images, or distinct and non-identical objects in two or more of the images, or any combination thereof. The learning module 120 may be configured to identify one or more visual cues for each image of the multiple images. The visual cues may include a variety of elements of the image that are associated with the object and/or with placement of the object. For example, if the object is a cup, the visual cues may include elements of the images such as saucers, coasters, plates, tables, drying racks, cabinets, beverage dispensers, and other elements. Alternatively, if the object is a screwdriver, the visual cues may include screws, hands, and other elements.

The learning module 120 may be configured to select a common visual cue of the multiple visual cues identified for each image that is common to each set of visual cues. In some embodiments, the common visual cue may be a visual cue that is in each image including the object. For example, some visual cues may be in some images but not in others. Some visual cues may be in each image that includes the object. The visual cues that are in each image that includes the object may be common visual cues. Alternatively or additionally, in some embodiments a common visual cue may be a visual cue that is in a certain percentage of images that include the object. For example, a common visual cue may be a visual cue that is in 50% of the images that include the object, 70% of the images that include the object, 90% of the images that include the object, or some other percentage of the images that include the object.

The learning module 120 may also be configured to determine a correlation between a location of the common visual cue in each of the multiple images and a location of the object in each of the multiple images. For example, in each image the location of the common visual cue may be different. In each image, the location of the object may also be different. The location of the common visual cue may be correlated with the location of the object in each image. In some embodiments, the learning module 120 may identify multiple common visual cues and may determine correlations between the location of each common visual cue and the location of the object. In these and other embodiments, the correlation between the location of a common visual cue and the location of the object may be low or zero, indicating no correlation between the two locations. In these and other embodiments, the learning module 120 may classify common visual cues with low correlation as irrelevant visual cues. The learning module 120 may identify one or more common visual cues as irrelevant visual cues and one or more common visual cues as relevant visual cues.

The learning module 120 may create one or more parameters for a model based on the correlations between the locations of the relevant common visual cues and the location of the object. The parameters for the model may be used to identify a placement location for an object in an environment of an image. In some embodiments, the learning module 120 may model the relationship between the locations of the relevant common visual cues and the location of the object using a weighted-average function, a centroid function, a non-linear function, a neural network, or other function or modeling types.

The learning module 120 may provide the parameters for the model and/or the correlations between the locations of the common visual cue and the locations of the object to the replay module 140.

In some embodiments, the learning module 120 may also be configured to obtain one or more audio cues from a human, such as the human 160. The audio cues may be received through the microphone 170. In these and other embodiments, the microphone 170 may be positioned near the robotic device 110. Alternatively or additionally, the microphone 170 may be placed in any other location. The microphone 170 may be communicatively coupled with the learning module 120. Alternatively or additionally, the microphone 170 may be communicatively coupled with other parts of the system 100. The microphone 170 may obtain audio cues, such as voice directions, from a human related to the placement position of an object in an environment.

For example, the audio cues may include directions related to where to place the object. A human, such as the human 160, may speak words indicating that the object be placed in a particular location or not be placed in a particular location. In these and other embodiments, the learning module 120 may incorporate the audio cues obtained from the microphone 170 into the parameters for the model. For example, based on one or more audio cues, the learning module 120 may determine that a particular common visual cue is not relevant to the placement of the object. Alternatively or additionally, the learning module 120 may determine that the placement of the object may deviate from the placement calculated using the model parameters in a particular instance of placing the object.

In some embodiments, the learning module 120 may also be configured to obtain one or more directional cues from a human, such as the human 160. The directional cues may be received through the camera 130. In these and other embodiments, the camera 130 may be positioned near the robotic device 110. In some embodiments, the camera 130 may be positioned on the robotic device 110 or as part of the robotic device 110. The camera 130 may be a standard digital camera, a video camera, an infrared camera, or another model or type of camera. In some embodiments, there may be two or more cameras 130. The camera 130 may capture a video of a human providing directional cues to the robotic device 110. For example, a human may be pointing in a particular direction, indicating the placement location for the object. The learning module 120 may incorporate the directional cues obtained from the camera 130 into the parameters for the model. For example, based on one or more directional cues, the learning module 120 may determine that a particular common visual cue is not relevant to the placement of the object. Alternatively or additionally, the learning module 120 may determine that the placement of the object may deviate from the placement calculated using the model parameters in a particular instance of placing the object.

Additionally or alternatively, the learning module 120 may also be configured to obtain direct demonstration data from observation of a human performing the operation of placing the object in a placement location. For example, the learning module 120 may obtain images or video from the camera 130. The images or video may include a direct demonstration of the placement of the object in a placement location by a human. For example, the direct demonstration data may be a video of a human placing the object in a placement location. The learning module 120 may incorporate the direct demonstration data obtained from the camera 130 into the parameters for the model.

In some embodiments, the learning module 120 may also be configured to obtain the placed location of the object from the demonstration module 150. The placed location may be determined from a kinesthetic demonstration by the human 160 using the robotic device 110. In these and other embodiments, the learning module 120 may incorporate the placed location of the object obtained from the demonstration module 150 into the parameters for the model. For example, based on the placed location, the learning module 120 may determine that a particular common visual cue is not relevant to the placement of the object. Alternatively or additionally, the learning module 120 may determine that the placement of the object may deviate from the placement calculated using the model parameters in a particular instance of placing the object.

In some embodiments, the learning module 120 may continually, periodically, pseudorandomly, or randomly learn and adapt based on the common visual cues, the audio cues, the demonstration data, the directional cues, and the direct demonstration data. In some embodiments, as the learning module 120 obtains more information and data, the learning module 120 may adapt and update the model parameters for the determination of a placement location for an object in an environment. The learning module 120 may facilitate the placement of an object in an environment in previously unseen configurations. In some embodiments, the learning module 120 may operate in an iterative manner. For example, the learning module 120 may develop a model. The replay module 140 may use the model to determine a placement location for an object. In response to the replay module 140 directing the robotic device 110 to place the object in an incorrect location, the human 160 may correct the placement location. The learning module 120 may adapt the model to identify the correct location. The learning module 120 may provide the model parameters, including any adjustments based on audio cues, directional cues, and the placed location, to the replay module 140.

The replay module 140 may be communicatively coupled with the camera 130, the learning module 130, and the robotic device 110. The replay module 140 may include software and programming. The software and programming of the replay module 140 may be configured to use the model parameters and the correlations obtained from the learning module 120 to provide instructions to the robotic device 110. For example, the replay module 140 may obtain an image of an environment from the camera 130. The replay module 140 may identify the locations of multiple common visual cues in the image of the environment. Based on the locations of the common visual cues and the model parameters or correlations obtained from the learning module 120, the replay module 140 may determine a placement location for the object in the environment.

For example, the model parameters may correlate the location of a common visual cue with the location of the object. The replay module 140 may obtain an image of an environment from the camera 130. The environment may be the location in which the robotic device 110 is located. In some embodiments, the image may include the object or multiple copies of the object. Alternatively or additionally, the image may not include the object. The image may include multiple common visual cues. Based on the locations of the common visual cues and the model parameters, the replay module 140 may determine a placement location for the object in the environment. The replay module 140 may translate the placement location for the object into instructions for the robotic device 110. For example, the replay module 140 may generate joint targets for the robotic device 110. By moving its joints into the joint targets, the robotic device 110 may place the object in the placement location in the environment.

The demonstration module 150 may be communicatively coupled with the robotic device 110 and the learning module 130. The demonstration module 150 may include software and programming. The software and programming of the demonstration module 150 may be configured to obtain demonstration data, such as joint data, from the robotic device 110 and convert the demonstration data into a placed location for the object. For example, in response to the human 160 interacting with the robotic device 110 to position the robotic device 110, the demonstration module 150 may obtain demonstration data from the robotic device 110. The demonstration module 150 may obtain kinesthetic demonstration data, demonstration via teleoperation data, or other demonstration data. The demonstration module 150 may convert the demonstration data into the placed location for the object and provide the placed location to the learning module 120.

The camera 130 may be communicatively coupled with the learning module 120 and the replay module 140. The camera 130 may include one or more digital cameras, video cameras, infrared cameras, or other devices capable of generating an image from a visual scene. The camera 130 may be configured to generate images or video, e.g., of visual cues from a human, that may be provided to the learning module 120 and/or to the replay module 140.

The microphone 170 may be communicatively coupled with the learning module 120. The microphone 170 may include one or more microphones. The microphone 170 may be configured to generate audio data, e.g., of audio cues from a human, that may be provided to the learning module 120.

Modifications, additions, or omissions may be made to the system 100 without departing from the scope of the present disclosure. For example, in some embodiments, the microphone 170 and the camera 130 may be combined into a single video camera or other device. Alternatively or additionally, in some embodiments the system 100 may not include the demonstration module 150, the human 160, or the microphone 170. In some embodiments, the learning module 120 and the replay module 140 may be combined into a single module.

Figure 2:
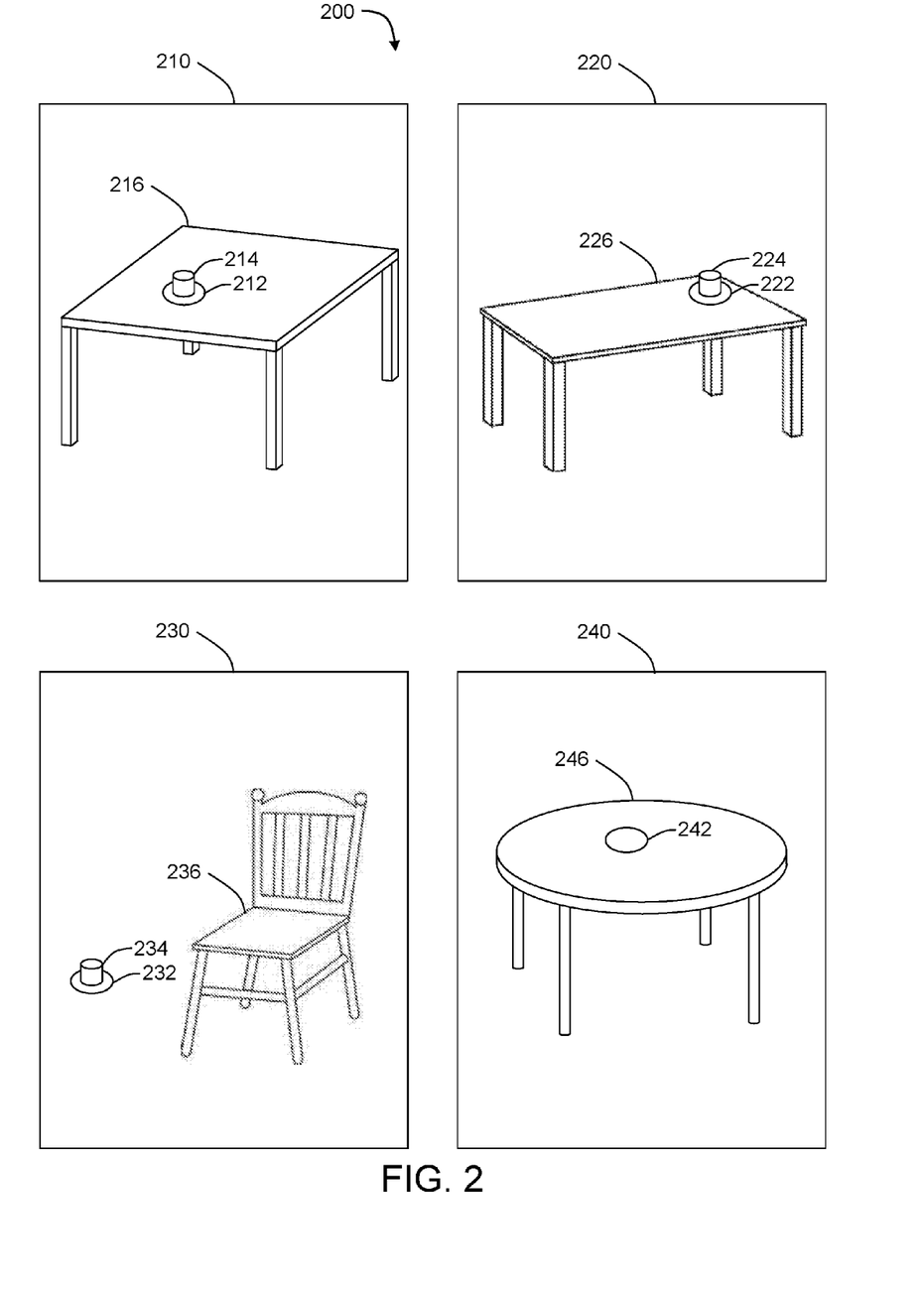
FIG. 2 illustrates an example of multiple images that may be used to teach a robotic device to place objects in a dynamic environment.

FIG. 2 illustrates an example of multiple images 200 that may be used to teach a robotic device to place objects in a dynamic environment, arranged in accordance with at least one embodiment described herein. In an example implementation, the images 200 may be processed by, e.g., the learning module 120 of FIG. 1 to teach the robotic device 110 how to place objects in the dynamic environment.

The images 200 of FIG. 2 include multiple learning images 210, 220, and 230 and an application image 240 of an environment. The images 200 include a common visual cue 212, 222, and 232 in each of the multiple learning images 210, 220, and 230 respectively, an object 214, 224, and 234 in each of the multiple learning images 210, 220, and 230 respectively, and other visual cues 216, 226, and 238 in each of the multiple learning images 210, 220, and 230 respectively. The application image 240 of the environment includes a common visual cue 242 and an additional visual cue 246.

A learning module, such as the learning module 120 of FIG. 1, may obtain some or all of the images 200. The images 200 may include images of different environments. For example, each images 200 may include a picture taken at a different location than other images. Alternatively or additionally, each of the images 200 may include a picture taken at a common (e.g., same) location at different times where an environment of the location changes in at least one respect from one of the images 200 to the next. In at least one embodiment, the environment of the application image 240 may be different in at least one respect from one or more environments represented by the learning images 210, 220, and 230.

As examples of the foregoing, each of the images 200 may include images of the same general location, for example images of the same room. Alternatively or additionally, each of the images 200 may include images of different general locations, for example images of different rooms or images of different physical locations. In some embodiments, some of the images 200 may include images of the same general location and some of the images 200 may include images of different general locations. Each of the images 200 may differ slightly in at least one respect, such as, for example, including a different location for the visual cues or the objects or including different elements or different locations of the same element(s).

Each of the learning images 210, 220, and 230 may include a variety of visual cues and elements that may be identified by the learning module to learn an object placement location for an object. In this regard, each of the learning images 210, 220, and 230 includes an object such as the objects 214, 224, and 234 respectively. In this example, the objects 214, 224, and 234 include cups. More generally, the object in images obtained by a learning module may include any object or type of object for which it may be desired to teach placement locations to a robotic device. As illustrated in the learning images 210, 220, and 230, the objects 214, 224, and 234 may be positioned at different locations in each of the learning images 210, 220, and 230. Alternatively or additionally, the objects 214, 224, and 234 may be positioned at different locations with respect to visual cues in each of the learning images 210, 220, and 230.

The learning module may identify multiple visual cues in the learning images 210, 220, and 230. For example, the learning image 210 may include visual cues 212 and 216. The visual cue 212 includes a coaster and the visual cue 216 includes a square table in the learning image 210. The learning image 220 may include visual cues 222 and 226. The visual cue 222 includes a coaster and the visual cue 226 includes a rectangular table in the learning image 220. The learning image 230 may include visual cues 232 and 238. The visual cue 232 includes a coaster and the visual cue 238 includes a chair in the learning image 230.

The learning module may identify the coasters 212, 222, and 232 as common visual cues because the coasters 212, 222, and 232 are in each of the learning images 210, 220, and 230 respectively. The learning module may determine that the tables 216 and 226 and the chair 238 are not common visual cues because there is no table in the learning image 230 and there are no chairs in the learning images 210 and 220. Alternatively or additionally, the learning module may determine that the tables 216 and 226 are common visual cues because the tables appear in greater than 50% of the learning images 210, 220, and 230. In contrast, the learning module may determine that the chair 238 is not a common visual cue because it appears in less than 50% of the learning images 210, 220, and 230.

The learning module may correlate the locations of each of the visual cues 212, 222, and 232 with each of the objects 214, 224, and 234 respectively. In this example, each of the visual cues 212, 222, and 232 is located underneath the respective objects 214, 224, and 234. In addition, each of the visual cues 214 and 224 is located on top of the visual cues 216 and 226. The learning module may determine model parameters to determine a placement location for the object based on the locations of the common visual cues.

A replay module, such as the replay module 140 of FIG. 1, may receive the model parameters and/or the correlations between the common visual cues and the objects. The replay module may also receive the application image 240. The application image 240 may not include an object similar to the objects 214, 224, and 234. Alternatively or additionally, the application image 240 may include an object similar to the objects 214, 224, and 234. The replay module may identify one or more common visual cues corresponding to the common visual cues identified in the learning images 210, 220, and 230. In this example, the common visual cue 236 (e.g., a round table) may be a common visual cue corresponding to the common visual cue 216 (e.g., a square table) of the learning image 210 and to the common visual cue 226 (e.g., a rectangular table) of the learning image 220. The common visual cue 242 (e.g., a coaster) may be a common visual cue corresponding to the common visual cues 212, 222, and 232 (e.g., coasters) of the learning images 210, 220, and 230 respectively.

Based on the locations of the common visual cues 242 and 246 in the application image 240, the replay module may determine that a location on top of the common visual cue 242 may be a placement location for the object in the environment represented by the application image 240. This determination may be translated into and/or used to generate instructions for placement of a corresponding object (e.g., a cup) by a robotic device in the environment represented by the application image 240.

Modifications, additions, or omissions may be made to FIG. 2 without departing from the scope of the present disclosure. For example, three learning images 210, 220, and 230 are depicted for the machine learning process. There may be more images or fewer images used in the learning module process. Additionally, although two visual cues were identified in each image of the learning images 210, 220, and 230, some images may include one visual cue, no visual cues, or many visual cues.

Although FIG. 2 is discussed with reference to one common visual cue 212, 222, and 232 in all of the learning images 210, 220, and 230 and one common visual cue 216 and 226 in the learning images 210 and 220, in practice there may be many common visual cues between the learning images that include the object. Additionally, although in the discussed example each object (e.g., cup) 214, 224, and 234 of the learning images 210, 220, and 230 respectively was located on top of the respective visual cues (e.g., coasters) 212, 222, and 232, in practice in some images the common visual cues may not be located in the same position relative to the object. For example, in some images a cup may be on a table without a coaster underneath it.

While the operation of the learning module is discussed above with reference to three learning images and with reference to cups, tables, and coasters as objects and/or visual cues, in practice the learning module and/or the replay module may be configured to determine a placement location for virtually any object. For example, in at least one embodiment, the object to place may include a part of a manufactured product to place on a moving conveyor belt in a factory or on a moving cart. The learning module may identify common visual cues for the part in images of the conveyor belt and may use machine learning to identify where to place the object as the common visual cues move relative to each other. The replay module may identify common visual cues in an image and may determine where to place the object in an environment represented by the image.

Alternatively or additionally, the object may include a sandwich or other food item and the common visual cues may include plates, bowls, cups, or other containers associated with placement of food items. In some embodiments, there may be multiple different objects. For example, the objects may include cutlery and other utensils. The common visual cues may include plates, other cutlery, cups, napkins, and other place settings. For example, the learning module may determine correlations between a soup spoon, a dessert spoon, a salad fork, a main course fork, a butter knife, a plate, a napkin, and other dinner place settings. The replay module may determine placement locations for each object in relation to each other object and/or in relation to visual cue(s) and may place the cutlery around a plate.

In some embodiments, the object may include a tool, such as a screwdriver or a hammer. Common visual cues may include screws, nails, human hands, and other items related to the use of the tool. The learning module may determine correlations between the tool, the nail or screw as appropriate, and the human hand. For example, a human may be holding the screw or the nail while a robotic device operates the tool.

In some embodiments, the object may include an item that may be stored on a movable shelf or a reconfigurable shelf in a warehouse or logistics setting. Common visual cues may include the shelves and other items on the shelves. The learning module may determine correlations between the item that may be stored on the shelf, the shelves, and the other items on the shelves.

Figure 3:
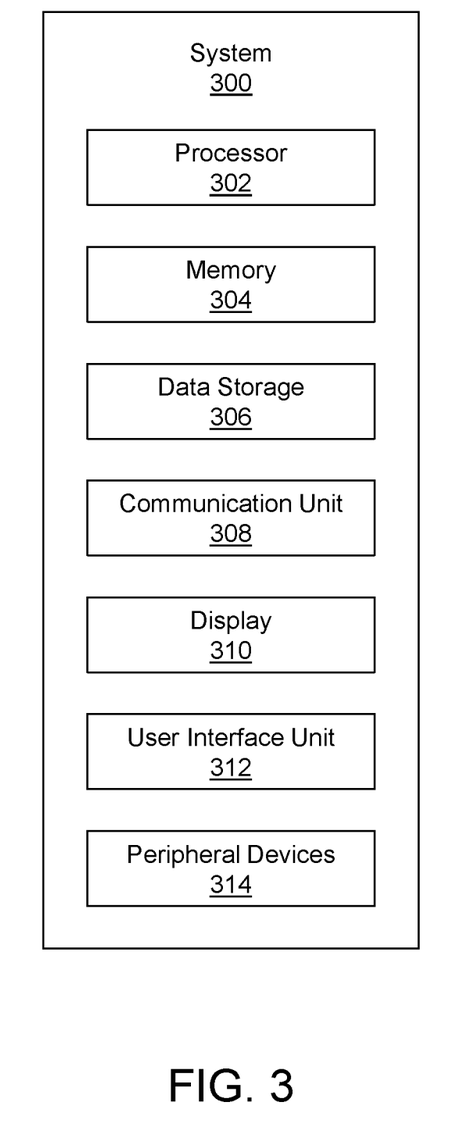
FIG. 3 illustrates an example computing system that may be used to teach a robotic device to place objects in dynamic environments.

FIG. 3 illustrates an example computing system 300 (hereinafter "system 300") that may be used to teach a robotic device to place objects in dynamic environments, arranged in accordance with at least one embodiment described in the present disclosure. In these and other embodiments, the system 300 may execute computer-readable instructions that include and/or relate to the learning module 120, the replay module 140, and/or the demonstration module 150 of FIG. 1.

As illustrated in FIG. 3, the system 300 may include a processor 302, a memory 304, a data storage 306, a communication unit 308, a display 310, a user interface unit 312, and a peripheral device 314, which all may be communicatively coupled. In some embodiments, the system 300 may be part of any of the systems or devices described in this disclosure. For example, the system 300 may be part of a robotics system such as the system 100 of FIG. 1 and/or may be part of the robotic device 110. Alternatively or additionally, the system 300 may include and/or may be coupled to one or more of the devices or modules of FIG. 1. For instance, the system 300 may include one or more of the learning module 120, the replay module 140, or the demonstration module 150 of FIG. 1 and/or may be communicatively coupled to the microphone 170, the camera 130, and/or the robotic device 110.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. As mentioned elsewhere, each of the learning module 120, the demonstration module 150, and the replay module 140 may include software and programming, which are examples of instructions that may be executed by the processor 302 to perform or control performance of one or more of the operations described herein.

Although illustrated as a single processor in FIG. 3, it is understood that the processor 302 may include any number of processors distributed across any number of networks or physical locations that are configured to perform individually or collectively any number of operations described herein. In some embodiments, the processor 302 may interpret and/or execute program instructions and/or process data stored in the memory 304, the data storage 306, or the memory 304 and the data storage 306. In some embodiments, the processor 302 may fetch program instructions from the data storage 306 and load the program instructions into the memory 304. For instance, the processor 302 may fetch one or more of the learning module 120, the demonstration module 150, and the replay module 140 or one or more portions thereof from the data storage 306 and may load the same into the memory 304 for execution by the processor 302.

After the program instructions are loaded into the memory 304, the processor 302 may execute the program instructions. For example, the system 300 may be included in, may be communicatively coupled to, and/or may include one or more of the robotic device 110, the microphone 170, the camera 130, the learning module 120, the replay module 140, or the demonstration module 150 of FIG. 1. In these and other embodiments, the instructions may include the processor 302 executing a machine learning algorithm (e.g., as embodied in the learning module 120 and/or the replay module 140) to determine correlations between the locations of common visual cues and the locations of objects and to determine a placement location for an object in an environment.

Figure 4:
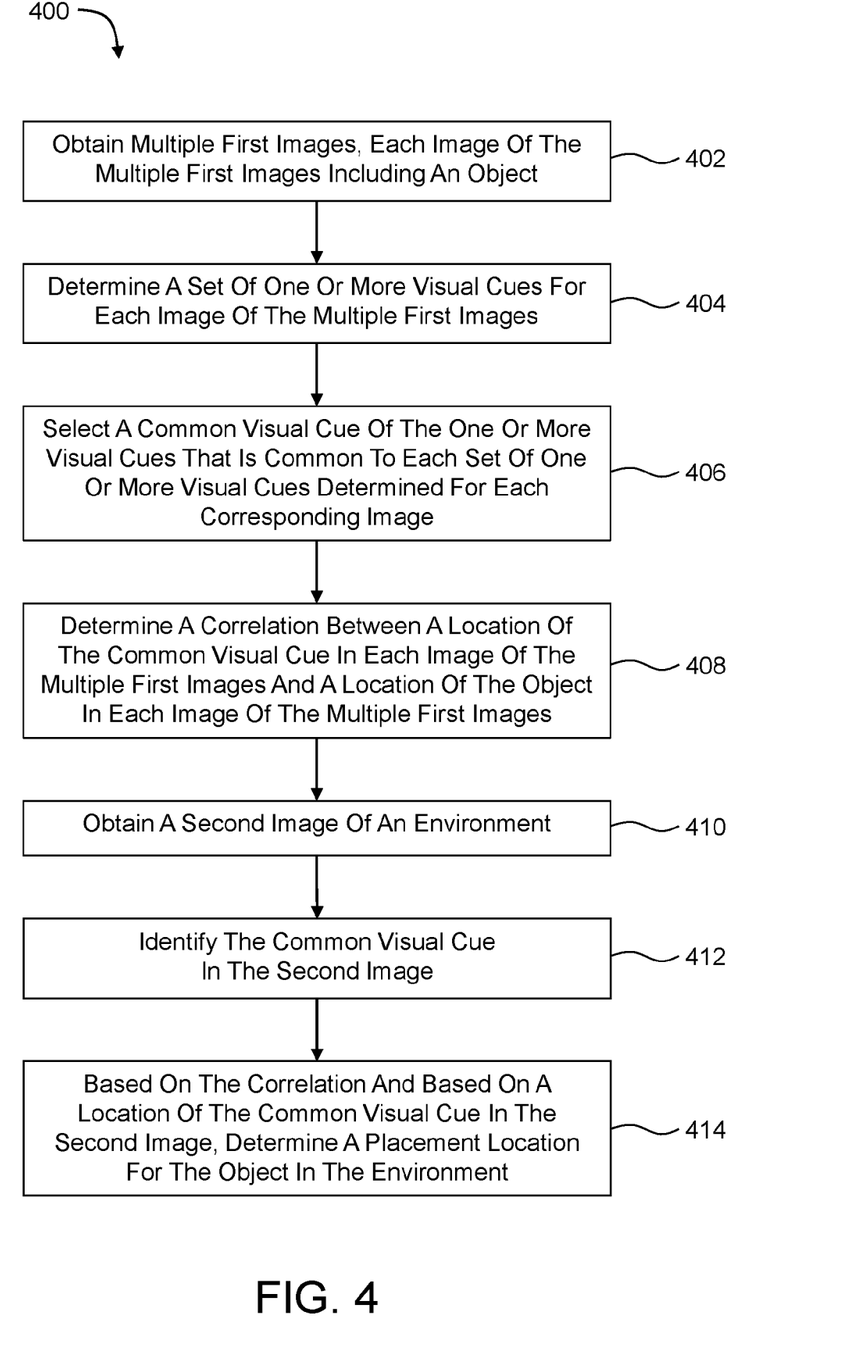
FIG. 4 is a flowchart of an example method to determine a placement location for an object in an environment, all arranged in accordance with at least one embodiment described herein.

The memory 304 and the data storage 306 may include non-transitory computer-readable storage media for carrying or having computer-executable instructions or data structures stored thereon. Such computer-readable storage media may be any available non-transitory media that may be accessed by a general-purpose or special-purpose computer, such as the processor 302. By way of example, and not limitation, such non-transitory computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage media which may be used to carry or store desired program code in the form of computer-executable instructions or data structures and which may be accessed by a general-purpose or special-purpose computer. Combinations of the above may also be included within the scope of non-transitory computer-readable storage media. Computer-executable instructions may include, for example, instructions and data configured to cause the processor 302 to perform or control performance of a certain operation or group of operations, such as one or more blocks of the method 400.

The communication unit 308 may include any component, device, system, or combination thereof that is configured to transmit or receive information over a network. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 308 may permit data to be exchanged with a network and/or any other devices or systems described in the present disclosure.

The display 310 may be configured as one or more displays, like an LCD, LED, or other type display. The display 310 may be configured to present video, text captions, user interfaces, and other data as directed by the processor 302.

The user interface unit 312 may include any device to allow a user to interface with the system 300. For example, the user interface unit 312 may include a mouse, a track pad, a keyboard, a touchscreen, and/or a piezoelectric transducer, among other devices. The user interface unit 312 may receive input from a user and provide the input to the processor 302.

The peripheral devices 314 may include one or more devices. For example, the peripheral devices may include a microphone (e.g., the microphone 170 of FIG. 1), an imager (e.g., the camera 130 of FIG. 1), and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure.

FIG. 4 is a flowchart of an example computer-implemented method to determine a placement location for an object in an environment, arranged in accordance with at least one embodiment described herein. The method 400 may be performed, in whole or in part, in some embodiments by a system such as the system 100 and/or the system 300 of FIGS. 1 and 3, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where multiple first images may be obtained. Each image of the multiple first images may include an object.

In block 404, a set of one or more visual cues for each image of the multiple first images may be determined.

In block 406, a common visual cue may be selected. The selected common visual cue may be a visual cue of the one or more visual cues that is common to each set of one or more visual cues determined for each corresponding image. In some embodiments, the common visual cue may be in one location of at least one image of the multiple first images and may be in a different location of at least one other image of the multiple first images.

In block 408, a correlation between a location of the common visual cue in each image of the multiple first images and a location of the object in each image of the multiple first images may be determined.

In block 410, a second image of an environment may be obtained. In some embodiments, the environment may be different in at least one respect from each environment represented by each image of the multiple first images. In block 412, the common visual cue may be identified in the second image.

In block 414, a placement location for the object in the environment may be determined. The placement location may be determined based on the correlation and based on a location of the common visual cue in the second image.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include instructing a robotic device to place the object at the placement location in the environment. The method 400 may further include the robotic device placing the object at the placement location in the environment.

In some embodiments, the method 400 may further include obtaining demonstration data from observation of a human. In these and other embodiments, the determination of the placement location for the object in the environment may further be based on the demonstration data.

In some embodiments, the method 400 may further include obtaining one or more audio cues from a human. In these and other embodiments, the determination of the placement location for the object in the environment may further be based on the one or more audio cues.

In some embodiments, the method 400 may further include obtaining one or more directional cues from a human. In these and other embodiments, the determination of the placement location for the object in the environment may further be based on the one or more directional cues.

Alternatively or additionally, the method 400 may further include obtaining demonstration data from observation of a human, one or more audio cues from a human, one or more directional cues from a human, or any combination of these. In these and other embodiments, the determination of the placement location for the object in the environment may further be based on the combination of the demonstration data, the one or more audio cues, and/or the one or more directional cues.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. All of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device may include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above may be varied—for example, blocks may be re-ordered, combined, and/or broken into sub-blocks. Certain blocks or processes may be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, various changes, substitutions, and alterations could be made hereto without departing from the spirit and scope of the invention.

What is claimed is:

1. A method of placing an object in a location, the method comprising:
    obtaining a first plurality of images, each image of the first plurality of images including an object;
    determining a set of one or more visual cues for each image of the first plurality of images;
    selecting a common visual cue of the one or more visual cues that is common to each set of one or more visual cues determined for each corresponding image;
    determining a correlation between a location of the common visual cue in each image of the first plurality of images and a location of the object in each image of the first plurality of images;
    obtaining a second image of an environment;
    identifying the common visual cue in the second image; and
    based on the correlation and based on a location of the common visual cue in the second image, determining a placement location for the object in the environment.

2. The method of claim 1, further comprising instructing a robotic device to place the object at the placement location in the environment.

3. The method of claim 2, further comprising the robotic device placing the object at the placement location in the environment.

4. The method of claim 1, wherein the environment is different in at least one respect from each environment represented by each image of the first plurality of images.

5. The method of claim 1, wherein the common visual cue is in one location of at least one image of the first plurality of images and is in a different location of at least one other image of the first plurality of images.

6. The method of claim 1, further comprising obtaining demonstration data from observation of a human, wherein determining the placement location for the object in the environment is further based on the demonstration data.

7. The method of claim 1, further comprising obtaining one or more audio cues from a human, wherein determining the placement location for the object in the environment is further based on the one or more audio cues.

8. The method of claim 1, further comprising obtaining one or more directional cues from a human, wherein determining the placement location for the object in the environment is further based on the one or more directional cues.

9. A non-transitory computer-readable medium having computer-executable instructions stored thereon that are executable by a processor to perform or control performance of operations comprising:
    obtaining a first plurality of images, each image of the first plurality of images including an object;

determining a set of one or more visual cues for each image of the first plurality of images;

selecting a common visual cue of the one or more visual cues that is common to each set of one or more visual cues determined for each corresponding image;

determining a correlation between a location of the common visual cue in each image of the first plurality of images and a location of the object in each image of the first plurality of images;

obtaining a second image of an environment;

identifying the common visual cue in the second image; and based on the correlation and based on a location of the common visual cue in the second image, determining a placement location for the object in the environment.

10. The non-transitory computer-readable medium of claim 9, wherein the operations further comprise: instructing a robotic device to place the object at the placement location in an environment represented by the second image.

11. The non-transitory computer-readable medium of claim 10, wherein the operations further comprise: the robotic device placing the object at the placement location in the environment.

12. The non-transitory computer-readable medium of claim 9, wherein the environment is different in at least one respect from each environment represented by each image of the first plurality of images.

13. The non-transitory computer-readable medium of claim 9, wherein the common visual cue is in one location of at least one image of the first plurality of images and is in a different location of at least one other image of the first plurality of images.

14. The non-transitory computer-readable medium of claim 9, wherein the operations further comprise: obtaining demonstration data from observation of a human, wherein determining the placement location for the object in the environment is further based on the demonstration data.

15. The non-transitory computer-readable medium of claim 9, wherein the operations further comprise: obtaining one or more audio cues from a human, wherein determining the placement location for the object in the environment is further based on the one or more audio cues.

16. The non-transitory computer-readable medium of claim 9, wherein the operations further comprise: obtaining one or more directional cues from a human, wherein determining the placement location for the object in the environment is further based on the one or more directional cues.

17. A system to place an object in a location, the system comprising:

a camera;

a learning module, the learning module configured to:

obtain a first plurality of images, each image of the first plurality of images including an object;

determine a set of one or more visual cues for each image of the first plurality of images;

select a common visual cue of the one or more visual cues that is common to each set of one or more visual cues determined for each corresponding image;

determine a correlation between a location of the common visual cue in each image of the first plurality of images and a location of the object in each image of the first plurality of images;

a replay module communicatively coupled to the camera and the learning module, the replay module configured to:

obtain a second image of an environment from the camera;

identify the common visual cue in the second image; and based on the correlation and based on a location of the common visual cue in the second image, determine a placement location for the object in the second image; and a robotic device communicatively coupled to the replay module and configured to place the object at the placement location in the environment in accordance with instructions received from the replay module.

18. The system of claim 17, the system further comprising a demonstration module communicatively coupled to the learning module and to the robotic device, the demonstration module configured to:

obtain demonstration data from observation of a human for placement of the object from the robotic device;

determine a placed location for the object from the demonstration data; and provide the placed location to the learning module;

and wherein determining the placement location for the object in the environment is further based on the placed location.

19. The system of claim 17, the system further comprising a microphone communicatively coupled to the learning module, the microphone configured to obtain one or more audio cues from a human, and wherein determining the placement location for the object in the environment is further based on the one or more audio cues.

20. The system of claim 17, wherein the learning module is further configured to obtain one or more directional cues from a human from the camera, and wherein determining the placement location for the object in the environment is further based on the one or more directional cues.

* * * * *